US012245705B2

(12) United States Patent
Freisler

(10) Patent No.: US 12,245,705 B2
(45) Date of Patent: Mar. 11, 2025

(54) SAFETY APPARATUS FOR INFANT BED

(71) Applicant: Yehiel Freisler, Eilat (IL)

(72) Inventor: Yehiel Freisler, Eilat (IL)

( * ) Notice: Subject to any disclaimer, the term of this patent is extended or adjusted under 35 U.S.C. 154(b) by 581 days.

(21) Appl. No.: 17/588,375

(22) Filed: Jan. 31, 2022

(65) Prior Publication Data

US 2022/0157142 A1 May 19, 2022

Related U.S. Application Data

(63) Continuation-in-part of application No. 16/737,951, filed on Jan. 9, 2020, now abandoned.

(30) Foreign Application Priority Data

Oct. 23, 2019 (IL) .......................................... 270129

(51) Int. Cl.
*A47D 9/00* (2006.01)
*A47D 15/00* (2006.01)
*G08B 21/02* (2006.01)

(52) U.S. Cl.
CPC ............... *A47D 9/00* (2013.01); *A47D 15/00* (2013.01); *G08B 21/02* (2013.01)

(58) Field of Classification Search
CPC ........ A47D 15/00; A47D 15/008; A47D 9/00; G08B 21/02
See application file for complete search history.

(56) References Cited

U.S. PATENT DOCUMENTS 4,951,032 A * 8/1990 Langsam ............... G08B 21/22 340/522
5,757,274 A * 5/1998 Slomowitz ............... A47D 7/02 340/556
6,225,913 B1 * 5/2001 Slomowitz ......... G08B 21/0461 340/539.1
9,510,693 B2 * 12/2016 Cordier .................. A47D 15/00
2013/0127620 A1 * 5/2013 Siebers ................. A61B 5/1113 340/573.1
2015/0288877 A1 * 10/2015 Glazer ................... H04N 7/183 348/77
2015/0302721 A1 * 10/2015 Schmidt ............... G01G 19/445 5/93.1
2016/0183695 A1 * 6/2016 Veron ................ G08B 21/0205 5/93.1
2016/0189513 A1 * 6/2016 Sloo ....................... G08B 7/066 340/522
2016/0262613 A1 * 9/2016 Klin ..................... A61B 3/0025
2016/0300467 A1 * 10/2016 Warren .................. G08B 21/02
2016/0345832 A1 * 12/2016 Pavagada Nagaraja ..................... G16H 40/67
2018/0035082 A1 * 2/2018 Patil ......................... A61B 5/45
2018/0053393 A1 * 2/2018 White .................. A61B 5/1128
2019/0012885 A1 * 1/2019 Kashar .................. G06F 1/1637
2020/0285248 A1 * 9/2020 Kim ....................... G05D 1/243
2021/0112647 A1 * 4/2021 Coleman ................ H05B 45/12

* cited by examiner

*Primary Examiner* — George Sun
(74) *Attorney, Agent, or Firm* — AlphaPatent Associates Ltd.; Daniel J. Swirsky

(57) ABSTRACT

A safety apparatus for an infant bed, including a first sensor, for sensing a distance of an infant disposed within the bed from a door thereof, a second sensor, for sensing a distance of an adult disposed outside the bed from the door, a third sensor, for sensing that the door is open, and an alarming gadget, for alarming in case, as sensed by the sensors, the door is open, and the adult's distance is sufficiently large, and the infant's distance is sufficiently small.

3 Claims, 3 Drawing Sheets

SAFETY APPARATUS FOR INFANT BED

CROSS-REFERENCE TO RELATED APPLICATIONS

This application is a Continuation-in-Part of U.S. patent application Ser. No. 16/737,951, filed Jan. 9, 2020, which claims the benefit of priority from Israel Patent Application No. 270129, filed Oct. 23, 2019, the disclosure of which is incorporated herein by reference.

TECHNICAL FIELD

The invention relates to the field of infant beds.

BACKGROUND

There is a long felt need for apparatus that an infant does not fall out of the infant bed.

SUMMARY

A safety apparatus for an infant bed, including:

an alarming gadget (54), for alarming in case, as sensed by sensors that, a door is open, and the adult's distance is sufficiently large, and the infant's distance is sufficiently small.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
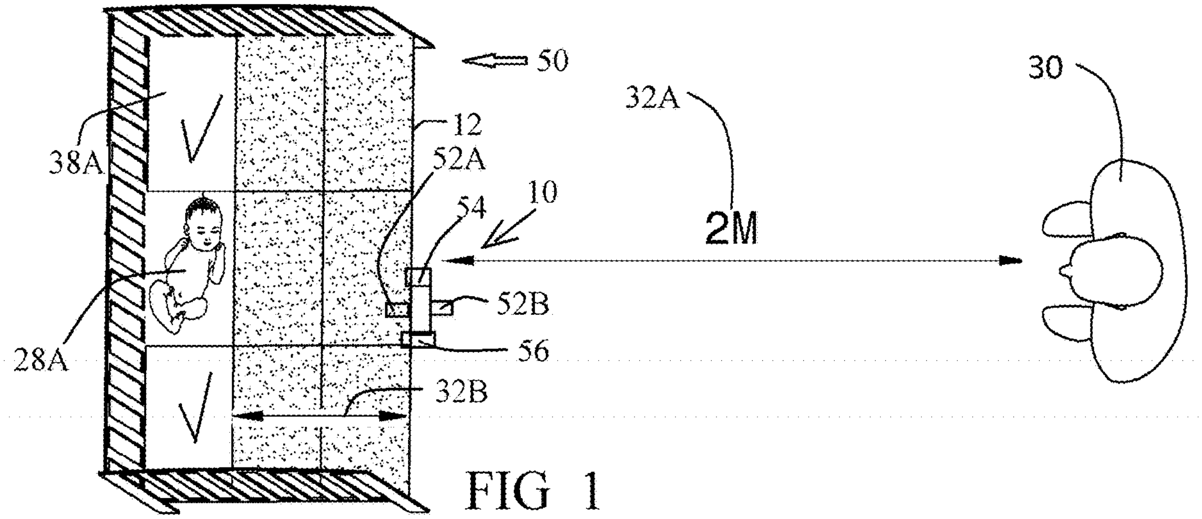
FIG. 1 is a top view of an infant bed including a safety apparatus according to one embodiment of the invention.

FIG. 1 is a top view of an infant bed including a safety apparatus according to one embodiment of the invention.

A safety apparatus 10 for an infant bed 50 includes a sensor 52A, for sensing the infant location; a sensor 52B, for sensing the adult location; a sensor 56, for sensing that the door 12 is open; and an alarming gadget 54, for alarming at danger that an infant might fall out of the infant bed.

According to one example, in case door 12 is open, and adult 30 is located 2 meters away, the infant may be located only in the inner zone 38A, being far (large distance) from the open door. Otherwise, alarming gadget 54 alarms.

Figure 2:
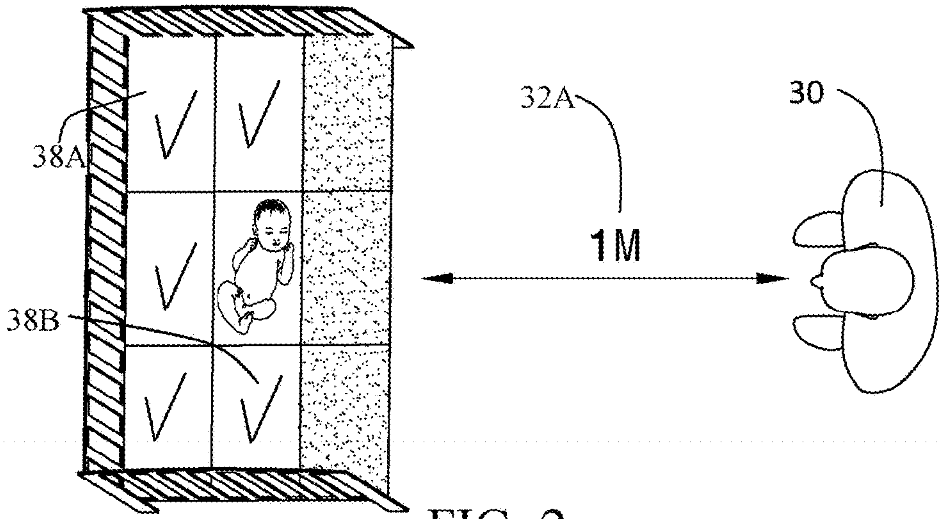
FIG. 2 is the top view of the infant bed including the safety apparatus of FIG. 1 in another case.

FIG. 2 is the top view of the infant bed including the safety apparatus of FIG. 1 in another case.

And in case door 12 is open, and adult 30 is located 1 meter away, the infant may be located in inner zone 38A, and as well in the central zone 38B (medium distance from door 12).

Figure 3:
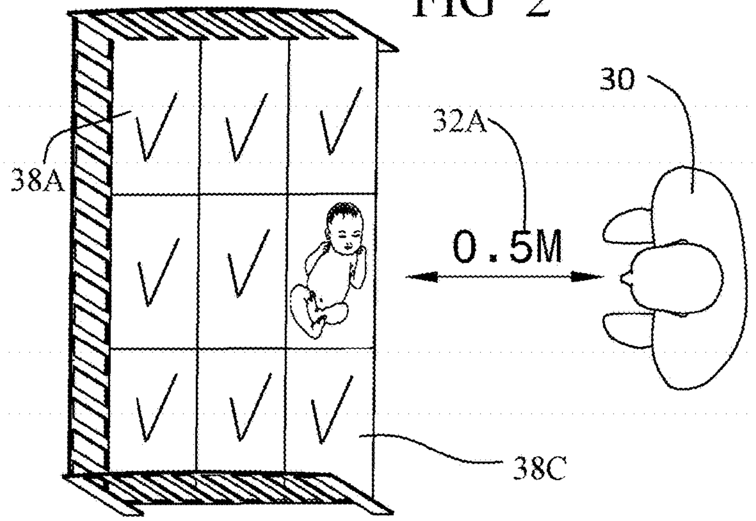
FIG. 3 is the top view of the infant bed including the safety apparatus of FIG. 1 in another case.

FIG. 3 is the top view of the infant bed including the safety apparatus of FIG. 1 in another case.

In case door 12 is open, and adult 30 is located 0.5 meter away, the infant may be located in any zone.

The above examples may apply to a 2 month old infant. However, the parameters are a function of the age.

Figure 4:
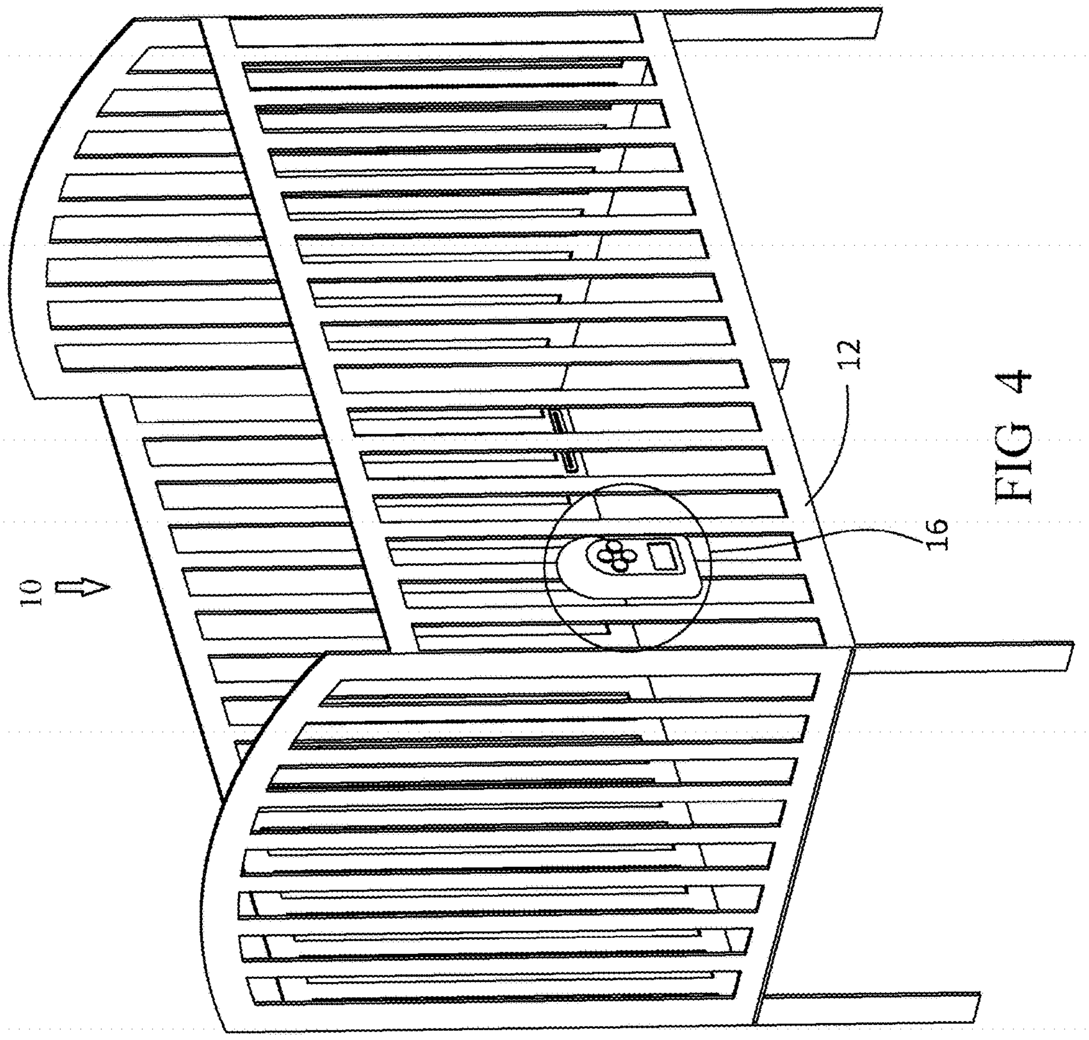
FIG. 4 is a perspective view of the infant bed including the safety apparatus of FIG.

FIG. 4 is a perspective view of the infant bed including the safety apparatus of FIG. 1.

Figure 5A:
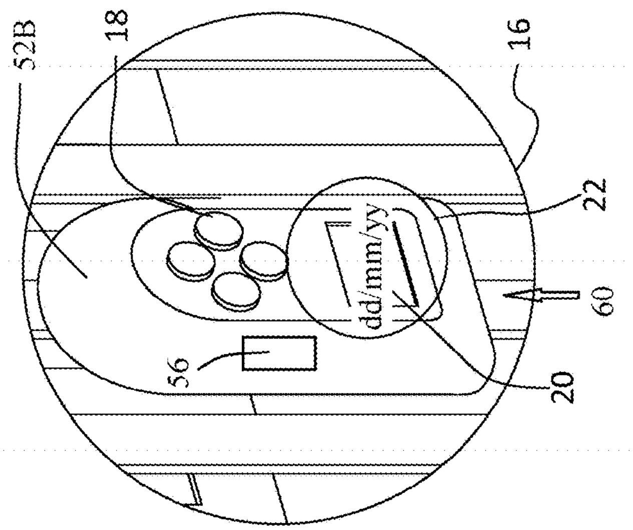
FIG. 5A magnifies the safety apparatus of FIG. 4.

FIG. 5A magnifies the safety apparatus of FIG. 4.

Safety apparatus 10 includes a controller 60 including a user interface 18 for inputting the infant's birth date 20 into a memory 56.

Figure 5B:
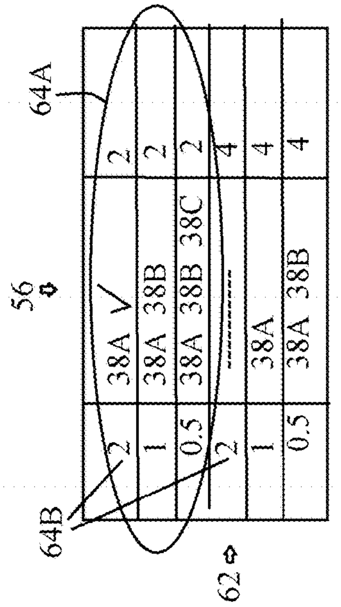
FIG. 5B presents the examples of FIGS. 1,2,3,6,7,8 in a list stored within the memory of the safety apparatus of FIG. 5A.

FIG. 5B presents the examples of FIGS. 1,2,3,6,7,8 in a list stored within the memory of the safety apparatus of FIG. 5A.

A list 62 stored in memory 56 includes the pre-determined distances and ages and the correspondences therebetween for alarming and not alarming.

According to one example, the inputted birth date is Jan. 1, 2022 and the current date is Mar. 1, 2022, then the age is 2 months, thus only cases 64A are available within list 62. In case adult 30 is located 2 meters away from the door, then only cases 64B are available within list 62.

Thus, according to list 62, the infant may be located only in the inner zone 38A, being far (large distance) from the open door, since only the first line of list 62, includes 2 meters of the adult (case 64A) and 2 months age (case 64B), thus corresponding with both of cases 64A and 64B. Otherwise, alarming gadget 54 alarms.

Figure 6:
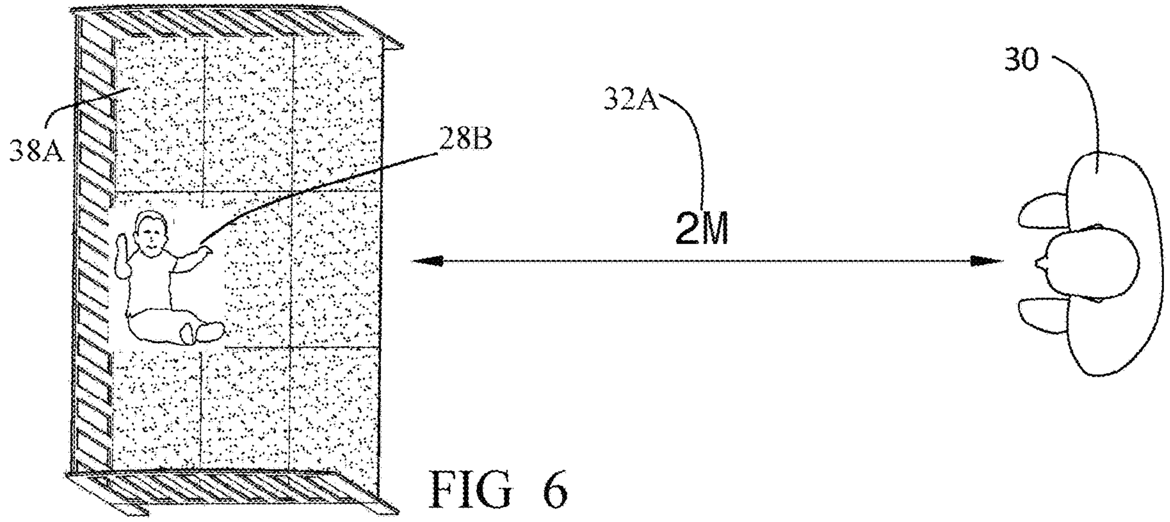
FIG. 6 is the top view of the infant bed including the safety apparatus of FIG. 1 in another case.

FIG. 6 is the top view of the infant bed including the safety apparatus of FIG. 1 in another case.

In case door 12 is open, and the infant has grown, such as to sit, such as 4 months old, and adult 30 is located 2 meters away, the alarm is turned on wherever the infant is located.

Figure 7:
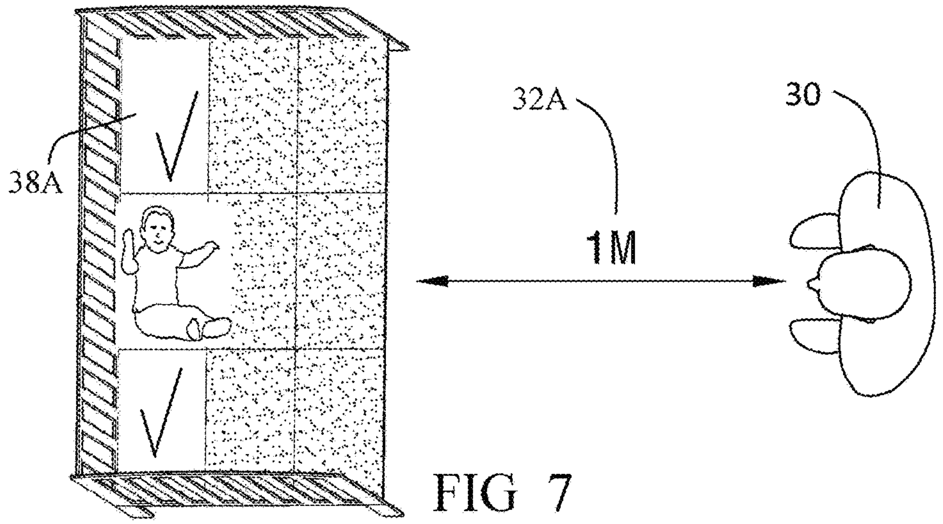
FIG. 7 is the top view of the infant bed including the safety apparatus of FIG. 1 in another case.

FIG. 7 is the top view of the infant bed including the safety apparatus of FIG. 1 in another case.

In case door 12 is open, and the infant has grown, such as to sit (4 months), and adult 30 is located 1 meter away, the infant may be located only in the inner zone 38A; otherwise, alarming gadget 54 alarms.

Figure 8:
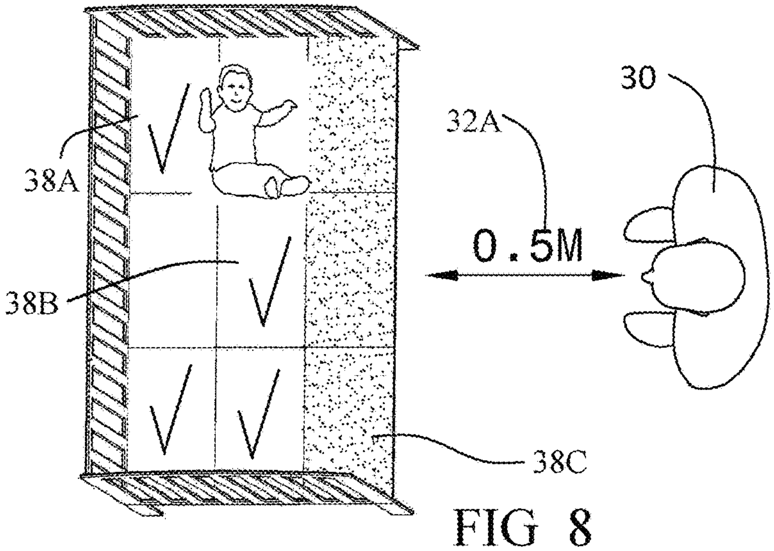
FIG. 8 is the top view of the infant bed including the safety apparatus of FIG. 1 in another case.

FIG. 8 is the top view of the infant bed including the safety apparatus of FIG. 1 in another case.

In case door 12 is open, and adult 30 is located 0.5 meter away, the infant may be located in inner zone 38A, and as well in the central zone 38B.

Thus, in one aspect, the invention is directed to a safety apparatus (10) for an infant bed (50), including:

a first sensor (52A), for sensing a distance (32A) of an infant (28A) disposed within the bed (50) from a door (12) thereof;

a second sensor (52B), for sensing a distance (32B) of an adult (30) disposed outside the bed (50) from the door (12);

a third sensor (56), for sensing that the door (12) is open; and an alarming gadget (54), for alarming in case, as sensed by the sensors (52A,52B,56), the door (12) is open, and the adult's distance (32A) is sufficiently large, and the infant's distance is sufficiently small.

The sufficiently large adult's distance (32A) and the sufficiently small infant's distance (32B) include a function of one another.

The safety apparatus (10) may further include:

a user interface (18), for obtaining an age of the infant, wherein the sufficiently large adult's distance (32A) and the sufficiently small infant's distance (32B) include functions of the infant's age.

In the figures and/or description herein, the following reference numerals (Reference Signs List) have been mentioned:

numeral 10 denotes the safety apparatus for infant bed 50 according to one embodiment of the invention;

12: door;

18: user interface;

20: inputted birth date for obtaining age;

28A,28B: infant;

32A,32B: distances;

38A,38B,38C: zones within bed 50;

50: infant bed;

52A,52B: distance sensors;

54: alarming gadget;

56: memory;

60: controller;

The foregoing description and illustrations of the embodiments of the invention have been presented for the purpose of illustration, and are not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

What is claimed is:

1. A safety apparatus for an infant bed, comprising:

a first sensor, for sensing a distance of an infant disposed within said bed from a door of said bed;

a second sensor, for sensing a distance of an adult disposed outside said bed from said door;

a third sensor, for sensing that said door is open;

memory comprising a list comprising pre-defined distances of the infant disposed within said bed from said door of said bed, and pre-defined distance of the adult disposed outside said bed from said door, wherein each of said pre-defined distances of the infant disposed within said bed from said door of said bed corresponds to one of said pre-defined distances of the adult disposed outside said bed from said door; and an alarming gadget, for alarming to indicate that said infant might fall from said infant bed through an opening of said door in case of a combination as sensed by said sensors, the combination being said door is open, and said adult is at least a predefined distance away from said door, and said infant is at most at said predefined distance away from said door according to said correspondence of said sensed distance of said adult, comprised in said list.

2. The safety apparatus according to claim 1, wherein said correspondence of said sensed distance comprises one of said predefined distances decreases as the other of said predefined distances decreases, and one of said predefined distances increases as the other of said predefined distances increases.

3. The safety apparatus according to claim 1, further comprising: a user interface, for obtaining an age of said infant, wherein said correspondence of said sensed distance further comprises: as said infant's age increases, either said predefined adult's distance from said door increases or said predefined infant's distance from said door decreases, and as said infant's age decreases, either said predefined adult's distance from said door decreases or said predefined infant's distance from said door increases.

* * * * *